(12) United States Patent
Saab et al.

(10) Patent No.: US 11,843,171 B2
(45) Date of Patent: Dec. 12, 2023

(54) MULTI-LAYER RECONFIGURABLE SURFACE FOR AN ANTENNA

(71) Applicant: Samsung Electronics Co., Ltd., Suwon-si (KR)

(72) Inventors: Sandy Saab, Austin, TX (US); Mohammed Reza Hashemi, Allen, TX (US); Shadi Abu-Surra, Plano, TX (US); Gang Xu, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/384,684

(22) Filed: Jul. 23, 2021

(65) Prior Publication Data

US 2022/0059943 A1 Feb. 24, 2022

Related U.S. Application Data

(60) Provisional application No. 63/066,956, filed on Aug. 18, 2020.

(51) Int. Cl.
*H01Q 15/14* (2006.01)
*H04B 7/04* (2017.01)

(52) U.S. Cl.
CPC ....... *H01Q 15/148* (2013.01); *H04B 7/04013* (2023.05)

(58) Field of Classification Search
CPC ........ H01Q 3/44; H01Q 3/46; H01Q 15/0006; H01Q 15/002; H01Q 15/0026;
(Continued)

(56) References Cited

U.S. PATENT DOCUMENTS

| 6,426,727 B2 | 7/2002 | Gilbert |
| 9,859,079 B2 | 1/2018 | Jarrahi et al. |

(Continued)

FOREIGN PATENT DOCUMENTS

| CN | 106877003 A | 6/2017 | |
| CN | 107819202 A * | 3/2018 | ............... H01Q 1/48 |

(Continued)

OTHER PUBLICATIONS

"Samsung's 6G White Paper Lays Out the Company's Vision for the Next Generation of Communications Technology", Samsung Global Newsroom, Jul. 14, 2020, 4 pages.

Ma, Xinying, et al., "Joint Channel Estimation and Data Rate Maximization for Intelligent Reflecting Surface Assisted Terahertz MIMO Communication Systems", IEEE Access, Jun. 8, 2020, vol. 8, 17 pages.

(Continued)

*Primary Examiner* — Ab Salam Alkassim, Jr.
*Assistant Examiner* — Leah Rosenberg

(57) ABSTRACT

A multi-layer reconfigurable reflective intelligent surface (RIS). The RIS includes a unit-cell of a reconfigurable intelligent surface. The unit-cell includes a first layer composed of a conductive material and structured according to a sub-wavelength reflective pattern. The first layer reflects an impinging wave at a predetermined phase and steers the reflected impinging wave toward an intended receiver. The unit-cell includes a second layer composed of a first dielectric substrate material. Between the first and second layers, the unit-cell includes a middle layer composed of a second dielectric material having tunable dielectric properties. Tuning a dielectric constant of the second dielectric material modifies the predetermined phase of reflection of the impinging wave.

20 Claims, 10 Drawing Sheets

(58) Field of Classification Search
CPC ............... H01Q 15/148; H04B 7/0617; H04B 7/04013; H01L 23/66; H01L 2223/6677; G02F 1/29; G02F 1/292
See application file for complete search history.

(56) References Cited

U.S. PATENT DOCUMENTS

| | | | |
|---|---|---|---|
| 2003/0112186 A1 | 6/2003 | Sanchez et al. | |
| 2016/0223723 A1 | 8/2016 | Han et al. | |
| 2017/0179596 A1 | 6/2017 | Diaz et al. | |
| 2018/0109002 A1 | 4/2018 | Foo | |
| 2018/0366824 A1* | 12/2018 | Shim | H01Q 3/08 |
| 2019/0025509 A1* | 1/2019 | Kim | G01S 17/36 |
| 2019/0033682 A1* | 1/2019 | Kafaie Shirmanesh | G02F 1/29 |
| 2019/0079321 A1* | 3/2019 | Wu | G02F 1/0555 |
| 2019/0089055 A1* | 3/2019 | Arnitz | H01Q 15/148 |
| 2020/0166423 A1 | 5/2020 | Rogers | |
| 2020/0227812 A1 | 7/2020 | Sun et al. | |
| 2020/0350691 A1* | 11/2020 | Somerlock, III | H01Q 15/0086 |
| 2021/0005979 A1* | 1/2021 | Chiu | H01Q 21/065 |

FOREIGN PATENT DOCUMENTS

| | | | | |
|---|---|---|---|---|
| CN | 106450765 B | * | 8/2019 | ............. H01Q 13/02 |
| CN | 111131096 A | | 5/2020 | |
| KR | 10-2016-0096527 A | | 8/2016 | |
| WO | 2012080532 A1 | | 6/2012 | |

OTHER PUBLICATIONS

Gong, Shimin, et al., "Toward Smart Wireless Communications via Intelligent Reflecting Surfaces: A Contemporary Survey", IEEE Communications Surveys & Tutorials, 2020, vol. 22, No. 4, 32 pages.
Hashemi, Mohammed R., et al., "Reconfigurable metamaterials for terahertz wave manipulation", Reports on Progress in Physics, Jul. 17, 2017, vol. 80, IOP Publishing Ltd, United Kingdom, 19 pages.
International Search Report and Written Opinion of the International Searching Authority dated Nov. 26, 2021, in connection with International Application No. PCT/KR2021/010950, 7 pages.
Extended European Search Report dated Oct. 27, 2023 regarding Application No. 21858580.0, 11 pages.
Hu et al., "Design and Measurement of Reconfigurable Millimeter Wave Reflectarray Cells With Nematic Liquid Crystal", IEEE Transactions On Antennas And Propagation, vol. 56, No. 10, Oct. 2008, pp. 3112-3117.
Couch et al., "A Phase-tunable, Liquid Crystal-based Metasurface", 10th International Congress on Advanced Electromagnetic Materials in Microwaves and Optics—Metamaterials, Sep. 2016, pp. 94-96.
Basar et al., "Wireless Communications Through Reconfigurable Intelligent Surfaces", IEEE Access, vol. 7, Aug. 2019, pp. 116753-116773.
Costanzo et al., "60 GHz microstrip reflectarray on a benzocyclobutene dielectric substrate", IET Science, Measurement and Technology, vol. 5, No. 4, Jul. 2011, pp. 134-139.

* cited by examiner

MULTI-LAYER RECONFIGURABLE SURFACE FOR AN ANTENNA

CROSS-REFERENCE TO RELATED APPLICATIONS AND CLAIM OF PRIORITY

This application claims priority to U.S. Provisional Patent Application No. 63/066,956 filed Aug. 18, 2020. The above-identified provisional patent application is hereby incorporated by reference in its entirety.

TECHNICAL FIELD

This disclosure relates generally to antenna systems. More specifically, this disclosure relates to a multi-layer reconfigurable surface for an antenna.

BACKGROUND

There is significant and severe path loss at the terahertz (THz) band. Current beamforming techniques use costly phased arrays or bulky reflector antennas that hinder and limit their applications. The THz band is highly susceptible to frequent link outages due to misalignment and obstruction, thus severely affecting the overall system throughput and reliability. There exists a radio frequency (RF) front-end issue in which the wireless communication system suffers from an inefficient transmit power and an increase of receiver noise figure and nonlinearity characteristics over an extremely wide bandwidth.

With the emergence of 6G as the next generation of wireless communication, there are fundamental challenges which include: severe path-loss, atmospheric absorption, RF front-end, antenna and lenses, beamforming architecture, new waveform design, channel modelling and terahertz protocol design.

SUMMARY

This disclosure provides a multi-layer reconfigurable intelligent surface for future 6G technologies.

In one embodiment, a reconfigurable intelligent surface (RIS) is provided. The RIS includes a unit-cell that includes a first layer composed of a conductive material and structured according to a sub-wavelength reflective pattern that reflects an impinging wave at a predetermined phase and that steers the reflected impinging wave toward an intended receiver. The unit-cell includes a second layer composed of a first dielectric substrate material. The unit-cell includes a middle layer positioned between the first layer and the second layer. The middle layer is composed of a second dielectric material having tunable dielectric properties. Tuning a dielectric constant of the second dielectric material modifies the predetermined phase of reflection of the impinging wave.

In another embodiment, a system is provided. The system includes a reconfigurable intelligent surface (RIS). The RIS includes a unit-cell of a reconfigurable intelligent surface (RIS). The unit-cell includes a first layer composed of a conductive material and structured according to a sub-wavelength reflective pattern that reflects an impinging wave at a predetermined phase and that steers the reflected impinging wave toward an intended receiver. The unit-cell includes a second layer composed of a first dielectric substrate material. The unit-cell includes a middle layer positioned between the first layer and the second layer. The middle layer is composed of a second dielectric material having tunable dielectric properties. Tuning a dielectric constant of the second dielectric material modifies the predetermined phase of reflection of the impinging wave.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
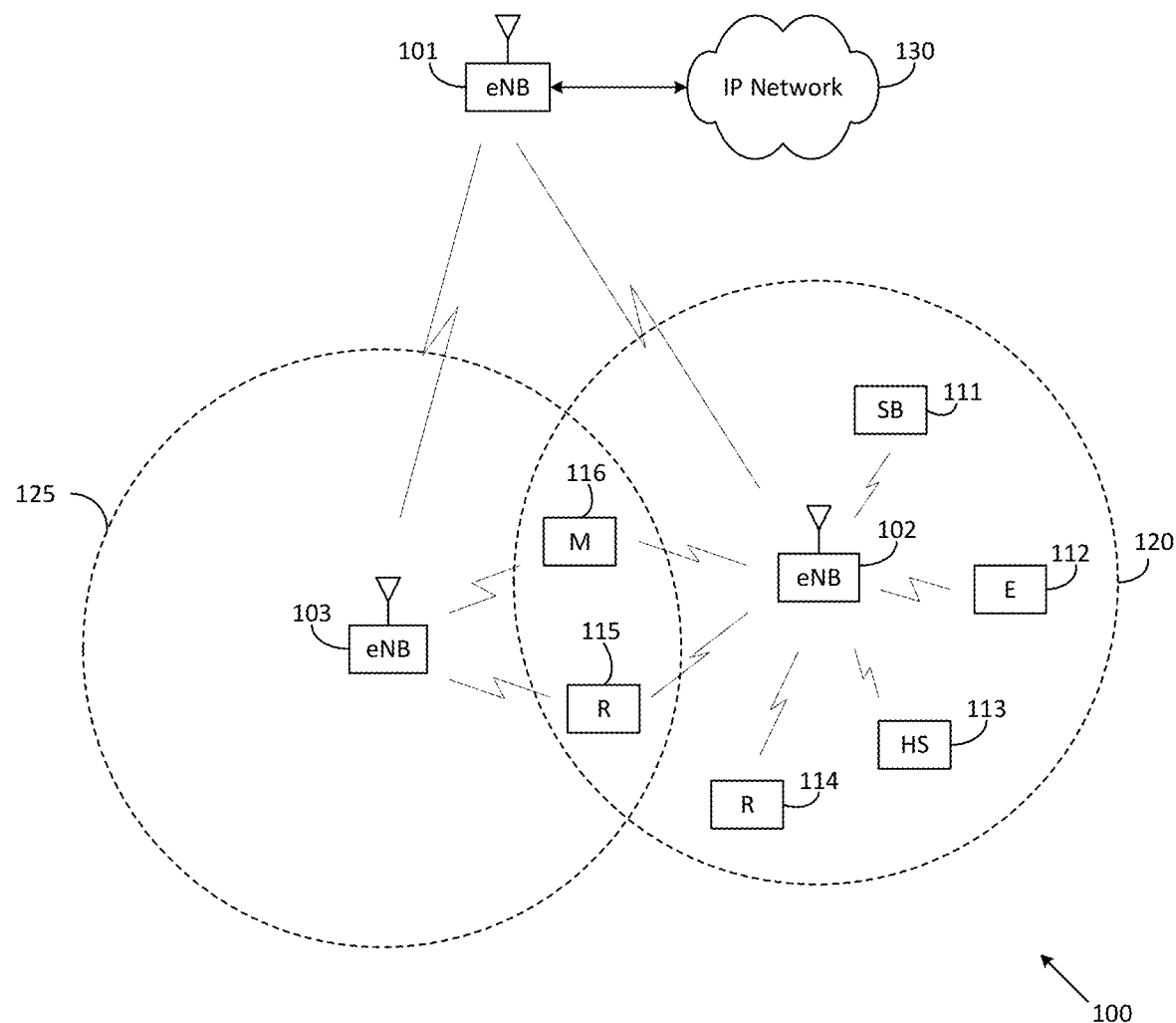
FIG. 1 illustrates an example wireless network according to this disclosure.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system or device.

As introduced above, with the emergence of 6G as the next generation of wireless communication, there are fundamental challenges which include: severe path-loss, atmospheric absorption, RF front-end, antenna and lenses, beamforming architecture, new waveform design, channel modelling and terahertz protocol design. There is a need to control the scattering, reflection, and deflection of electromagnetic signals and achieve the necessary polarization modulation, amplitude modulation, beam steering, and the like. As a solution, embodiments of this disclosure provide a reconfigurable intelligent surface (RIS), which is a programmable reflective meta-surface(s) or antenna(s) used as a platform for controlling the state of the imposing electromagnetic waves.

According to embodiments of this disclosure, the RIS controls the properties of electromagnetic signals, acts as a reflector, and directs the impinging wave to an intended receiver, namely, a user equipment or a base station. In a particular example, a base station sends control signals to an RIS controller (for example, a field-programable gate array (FPGA)) through a dedicated control link. In response, the RIS panels adjust the properties of the incident wave to enhance and improve the signal quality at the receiver front-end.

An RIS system is set to provide more reliable and space-intensive wireless communications compared to conventional antenna-array systems. A system enhanced by the MS enriches the channel environment by adding multiple paths with distinctively different spatial angles. Each unit-cell on the RIS surface can control its angle and create a focused and collimated beam, which achieves a multiplexing gain even in a scenario when the direct path has low rank. The RIS system of this disclosure provide serval technical advantages, such as: controlling the scattering, reflecting, and deflecting of waves; achieving necessary polarization modulation, amplitude modulation, beam steering and the like. The RIS system of this disclosure provide other technical advantages, such as: moderating severe path loss; mitigating blockage vulnerability at the THz band. Additional technical advantages of the RIS system include using the available spectrum efficiently in the THz band to achieve the advantage of communications at terabits per second (Tbps) data rates. The RIS system achieves multiplexing gains from multipath signals. The RIS system does not use excessive RF chains in massive MIMO antenna systems, but instead uses one RF chain for the entire RIS surface, which not only reduces hardware costs, but also reduces system complexity and energy consumption. That is, the RIS system solves the issue associated with increased energy consumption in RF chains. The RIS system supports energy-efficient wireless communication and can be used as a reflective antenna. The RIS system handles processing complexity of communications in the THz region. The RIS system enhances coverage capability for indoor scenarios of wireless communication.

Technologists estimate that the number of connected devices will exceed 500 billion by the year 2030. Various machines will need to communicate across wireless channels. In future 6G technologies, the frequency platform shifts upward to reach THz bands. Accordingly, path loss and severe fading will result in a weak signal to noise ratio (SNR). With the advancement in wireless communication, a number of solutions to achieve reliable transmission and reception links are possible. Employing extra relays or base stations can lead to an increase in deployment cost as well as extra radiation. This disclosure provides a promising solution in which large intelligent surfaces aid in reflecting and redirecting the signals and controlling its properties in a controllable and less costly manner. According to embodiments of this disclosure, the design of these large-scale intelligent surfaces is not limited to the sub 6-GHz band, 6G technologies, or at the mmWave band. For example, embodiments can be utilized in other frequency bands or with earlier or later generations of wireless technology standards. Various embodiments of the present disclosure provides large-scale intelligent surfaces that are designed as a frequency selective surface that operates at the low THz band to provide Tbps data rates and controlled reflective phase.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques, such as future 6G technologies.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, a multi-layer reconfigurable intelligent surface for future 6G technologies reduces path loss and provides a higher achievable data rate per receiver. More particularly, multi-layer reconfigurable intelligent surface connects to a variable voltage source that applies a selected control voltage that tunes a dielectric constant of a middle layer, which modifies a predetermined phase of reflection of an impinging wave and steers the reflected wave at a predetermined angle toward an intended receiver.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2:
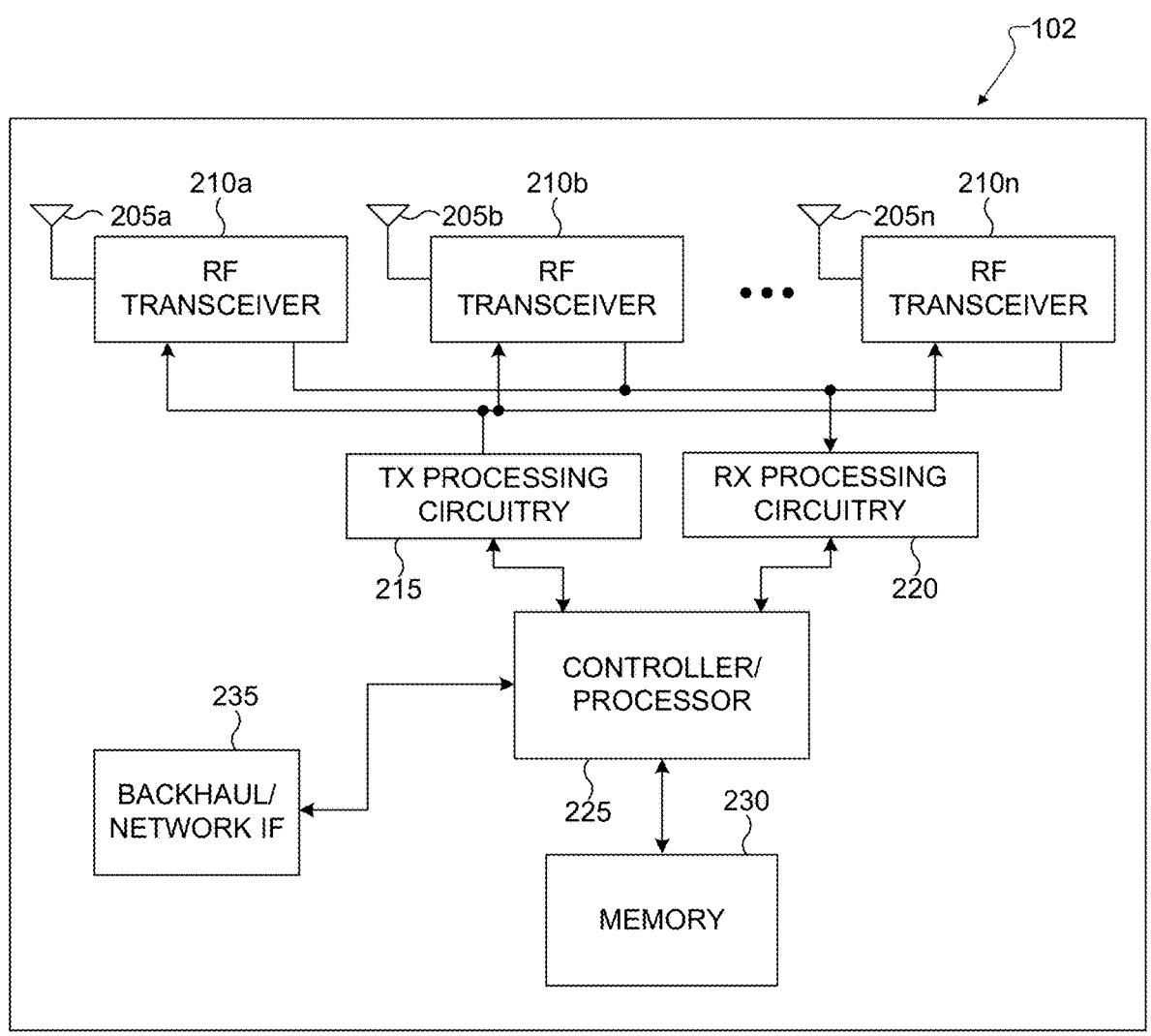
FIG. 2 illustrates an example eNodeB (eNB) according to this disclosure.

FIG. 2 illustrates an example eNB 102 according to this disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225. In some embodiments, the controller/processor 225 includes at least one microprocessor or microcontroller.

The controller/processor 225 is also capable of executing programs and other processes resident in the memory 230, such as a basic OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A, or future 6G technologies), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

As described in more detail below, the BS 102 may include one or more multi-layer reconfigurable surfaces for the antennas 205a-205n that can reduce path loss and provide a higher achievable data rate per receiver.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

Figure 3:
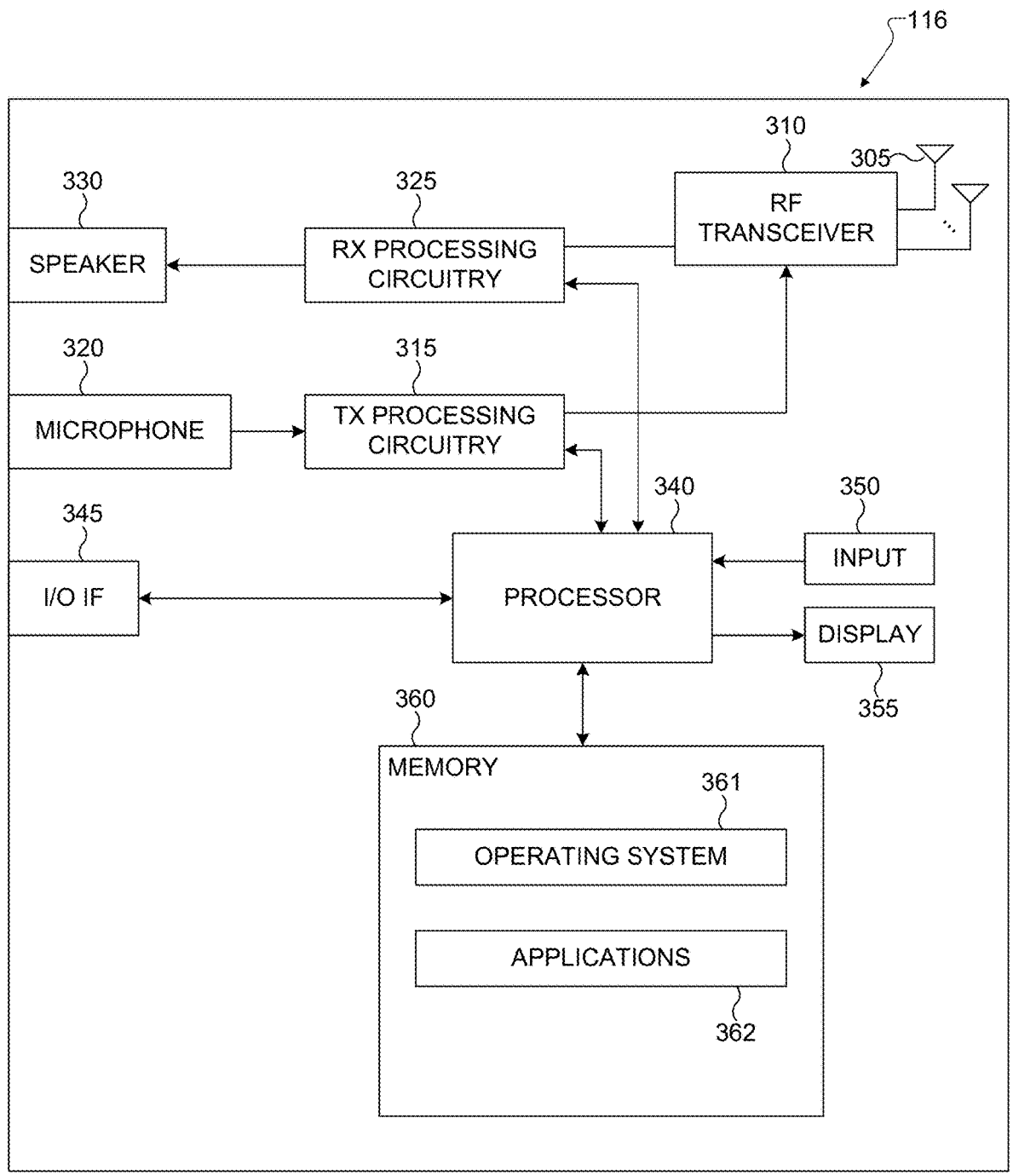
FIG. 3 illustrates an example user equipment (UE) according to this disclosure.

FIG. 3 illustrates an example UE 116 according to this disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

The UE 116 includes antenna(s) 305, a radio frequency (RF) transceiver 310, transmit (TX) processing circuitry 315, a microphone 320, and receive (RX) processing circuitry 325. The UE 116 also includes a speaker 330, a processor 340, an input/output (I/O) interface 345, an input 350, a display 355, and a memory 360. The memory 360 includes an operating system (OS) program 361 and one or more applications 362.

The RF transceiver 310 receives, from the antenna(s) 305, an incoming RF signal transmitted by a gNB of the wireless network 100 of FIG. 1. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS program 361 stored in the memory 360 in order to control the overall operation of the UE 116. For example, the processor 340 can control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 can execute other processes and programs resident in the memory 360, such as operations for beam selection for systems described in embodiments of the present disclosure as described in embodiments of the present disclosure. The processor 340 can move data into or out of the memory 360 as part of an executing process. In some embodiments, the processor 340 is configured to execute the applications 362 based on the OS program 361 or in response to signals received from gNBs or an operator. The processor 340 is also coupled to the I/O interface 345, which provides the UE 116 with the ability to connect to other devices such as laptop computers and handheld computers. The I/O interface 345 is the communication path between these accessories and the processor 340.

The processor 340 is also coupled to the input 350 (e.g., keypad, touchscreen, button etc.) and the display 355. The operator of the UE 116 can use the input 350 to enter data into the UE 116. The display 355 can be a liquid crystal display or other display capable of rendering text and/or at least limited graphics, such as from web sites.

The memory 360 is coupled to the processor 340. The memory 360 can include at least one of a random-access memory (RAM), Flash memory, or other read-only memory (ROM).

As described in more detail below, the UE 116 includes a multi-layer reconfigurable surface for the antenna(s) 305 that can reduce path loss and provide a higher achievable data rate per receiver.

Although FIG. 3 illustrates one example of UE 116, various changes may be made to FIG. 3. For example, various components in FIG. 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
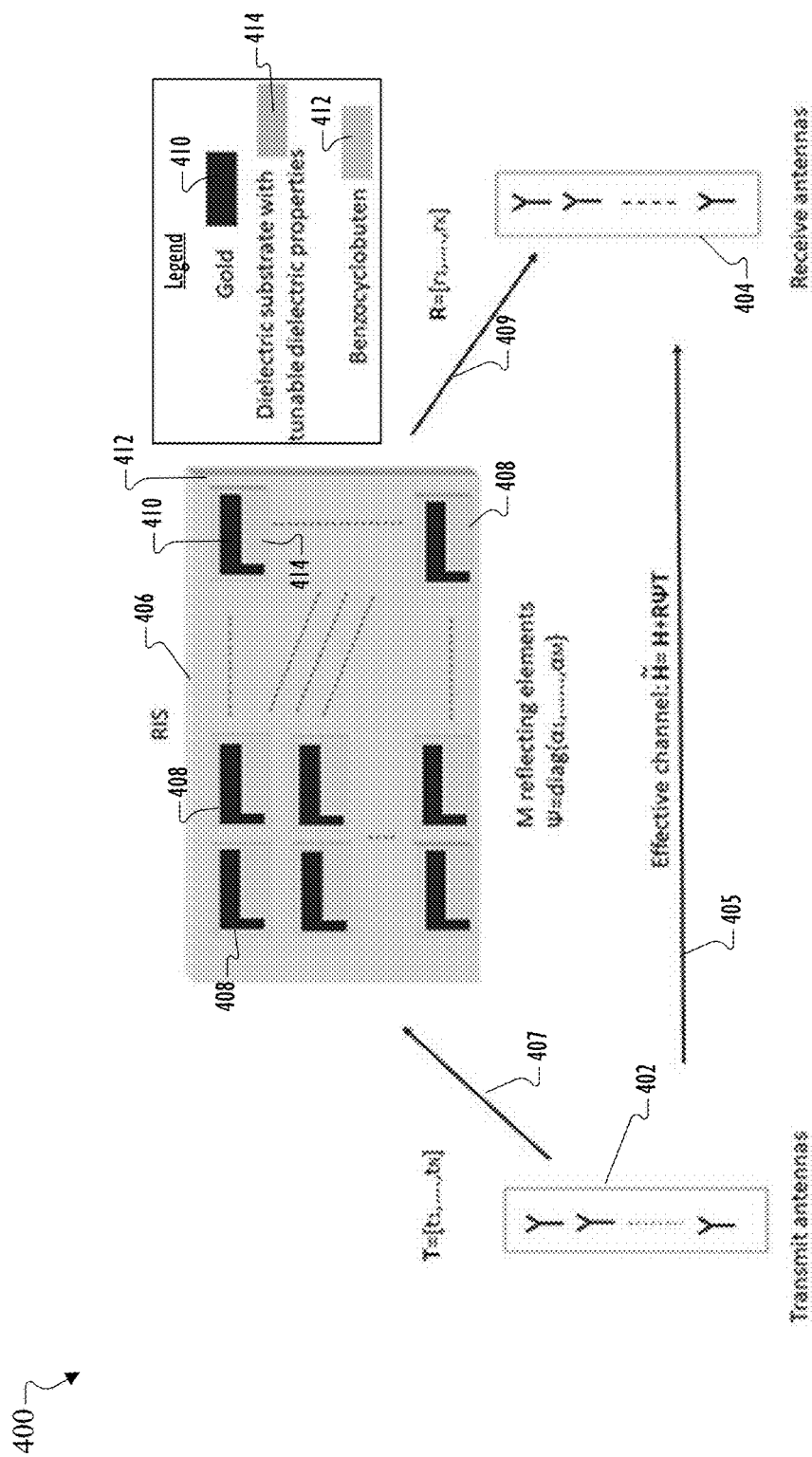
FIG. 4 illustrates an example system of a wireless communication channel composed of multiple transmitting antennas and multiple receiving antennas interacting with a reconfigurable intelligent surface (RIS) in accordance with an embodiment of this disclosure.

FIG. 4 illustrates an example system 400 of a wireless communication channel composed of N transmitting antennas 402 and K receiving antennas 404 interacting with a reconfigurable intelligent surface (RIS) 406 in accordance with an embodiment of this disclosure. More particularly, the wireless communication channel is a 6G wireless communication channel. The N transmitting antennas 402 and K receiving antennas 404 can represent a single input-single output (SISO), multiple input-single output (MISO), single input-multiple output (SIMO), or multiple input-multiple output (MIMO) system. The N transmitting antennas 402 can represent antennas of the eNB 102 of FIG. 1. The K receiving antennas 404 can represent antennas of the UE 116 of FIG. 1.

When the N transmitting antennas 402 transmits signals 405 and 407 to the K receiving antennas 404, the signals can propagate in different directions. The K receiving antennas 404 receive the transmitted signals either directly or after reflected upon (i.e., based on being incident upon) the surface of the RIS 406. Some of the transmitted signals 405 propagate along a direct path to the K receiving antennas 404, for example, in a situation of low interference. One or more of the transmitted signals 407 from the N transmitting antennas 402 impinge on the RIS 406, which reflects the impinging signal 407 at a predetermined phase and steers the reflected impinging wave 409 toward the K receiving antennas 404 (i.e., an intended receiver), for example, in a situation of high interference. Accordingly, the effective channel from the N transmitting antennas 402 to the K receiving antennas 404 is defined as the summation of the direct channel (e.g., including signals 405) plus the RIS assisted channel (e.g., including signals 407) which includes the reflection matrix $\Psi$.

The example RIS 406 shown in FIG. 4 is a generic representation of an RIS that is composed of $N_{RIS} \times M_{RIS}$ unit-cells 408 and is designed and configured (e.g., dedicated) for an operating frequency of f=140 GHz with a bandwidth (BW) of 8 GHz. It is understood that the RIS 406 represents any of the various specific embodiments of the reconfigurable intelligent surfaces that are described more particularly below and shown in FIGS. 5-9 of this disclosure. The MS 406 is composed of at least three layers and includes a number M of unit-cells 408. With the RIS 406 being composed from the M unit-cells 408, accordingly, the layers of the RIS 406 are the same layers that compose each unit-cell 408. A unit-cell 408 can also be referred to as an "element," "reflecting element," "periodic element structure," "unit element."

The design methodology used in the disclosure for designing the RIS 406 to perform total reflection at the operating frequency of f=140 GHz is the same design methodology that can be applied to design RIS structures with other operating frequencies. For example, design parameters of the unit-cell 408 or of the RIS 406 can be tuned to operate around an operating frequency of f=150 GHz. Also, the design parameters can be chosen to operate in different bands such as mmWave or frequencies below 6 GHz ("Sub-6"). The mmWave band can be defined as frequencies greater than 30 GHz and less than 300 GHz. In certain embodiments, the RIS 406 is configured for 6G technologies at terahertz (THz) and sub-THz frequencies. The sub-THz frequency region can be defined as frequencies greater than 100 GHz and less than 300 GHz.

A reflective surface antenna includes the RIS 406, in which the plurality of unit cells 408 are arranged in the $N_{RIS} \times M_{RIS}$ array. In the example shown, the RIS 406 is composed of three layers. The top layer 410 (e.g., first layer) is a conducting layer that includes a two-dimensional (2D) array of sub-wavelength reflective patterns that reflect an impinging wave. The bottom layer 412 (e.g., second layer) is composed of a first dielectric material. An example of the first dielectric material is benzocyclobutene (BCB) polymer, which has a low dielectric loss. Although the example RIS 406 described in this disclosure has a bottom layer 412 composed of BCB, other dielectric material with comparable electrical properties can be used without departing from the scope of this disclosure. The middle layer 414 is positioned between the top layer 410 and the bottom layer 412 and is composed of a second dielectric material having tunable dielectric properties. Examples of the second dielectric material include: doped silicon (Si), Gallium arsenide (GaAs), or graphene. The middle layer 414 is a tunable dielectric substrate that controls the phase of the reflected wave 409 from each unit-cell 408 in the array on the surface.

More particularly, each unit-cell 408 of the RIS 406 controls the reflection of the signal 407 at a specific predetermined phase. By controlling the phase of and steering the direction of the reflected wave 409, the unit-cell 408 increases and optimizes the channel capacity, which improves the signal-to-noise-ratio (SNR) of the receiving antennas 404. That is, the unit-cell 408 enables maintenance of a reliable wireless link between the N transmitting antennas 402 and the K receiving antennas 404. The optimization of the data rate by the unit-cell 408 is primarily dependent on the efficiency of the designed reflective surface of the RIS 406.

The MS 406 includes a metallic frame ring (such as the conducting frame 604 shown in FIGS. 6 and 7A) around the RIS. In this design, the RIS 406 includes a periodic metallic pattern or a cross-shaped behavioral structure that is insensitive to polarization. Although the various embodiments of the RIS 406 illustrated in this disclosure do not use a ground plane underneath the bottom layer 412 substrate, other embodiments could include a complete ground plane across the entire surface (e.g., bottom layer). In such other embodiments, the ground plane functions as a complete reflector for all frequencies. The ground plane sustains selectivity at a desired resonant frequency. In order to make the ground plane frequency selective, the design parameters of the reflecting surface (e.g., top layer) includes a metallic pattern that reflects the selected frequency bands. The process of controlling the performance of the ground plane structure to work in harmony with the top reflective structure may be tedious compared to the process of controlling the RIS 406 that includes the encircling metallic frame ring.

Figure 5:
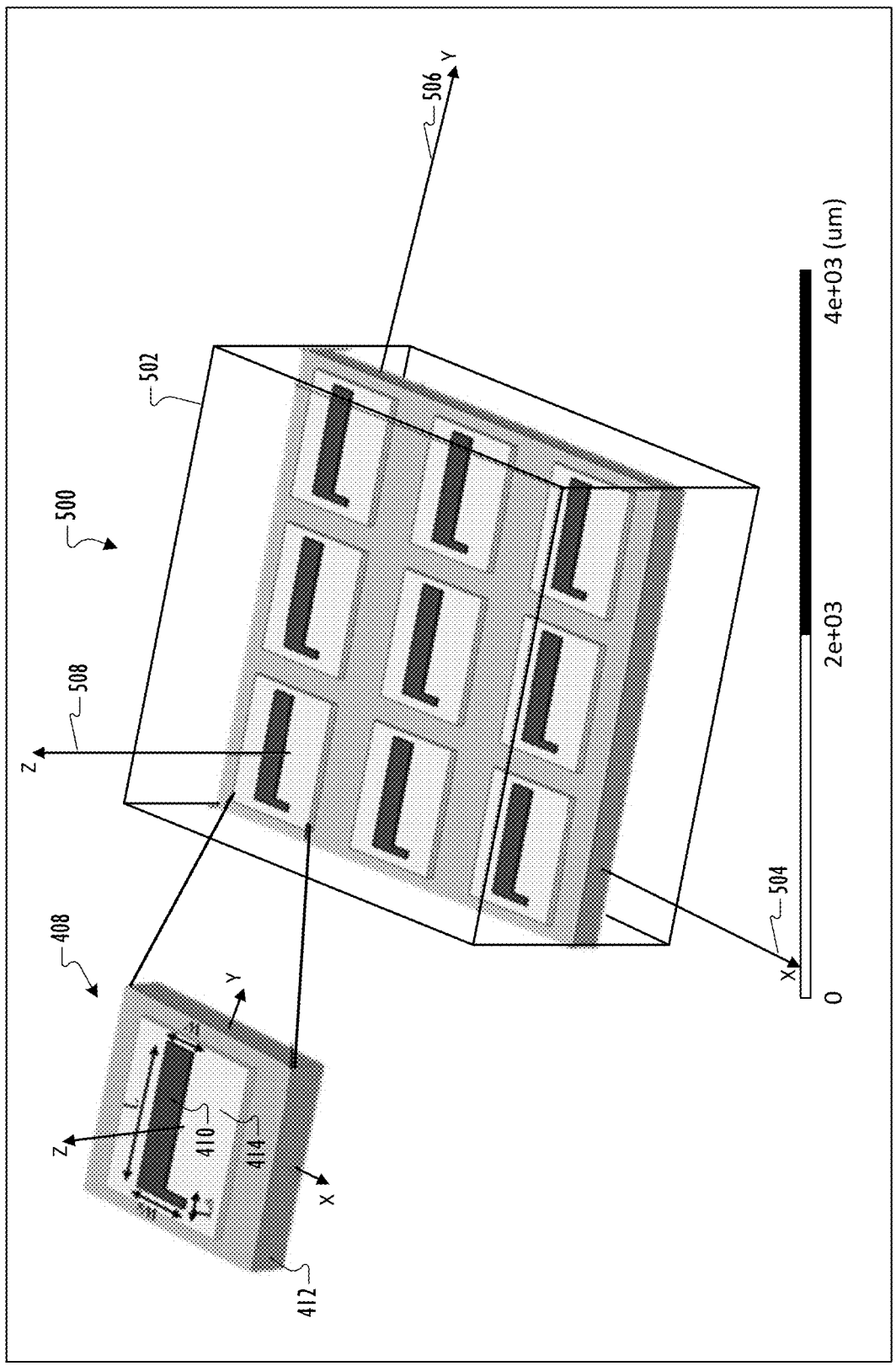
FIG. 5 illustrates an example frequency selective surface (FSS) based RIS in which unit-cells are arranged in a 3×3 array according to this disclosure.

FIG. 5 illustrates an example FSS-based MS 500 in which unit-cells 408 are arranged in a 3×3 array according to this disclosure. The MS 500 of FIG. 5 represents a first embodiment and can be the same as or similar to the RIS 406 of FIG. 4. Additionally, FIG. 5 shows a zoomed-in view of an individual unit-cell 408 that forms the $N_{RIS} \times M_{RIS}$ array. As a particular embodiment, the RIS 500 is selective at the operating frequency of f=140 GHz. For ease of illustration, the RIS 500 was drawn using a high frequency structure simulator (HFSS), in which a master-slave boundary condition 502 and two floquet ports are used to indicate the direction of propagation of the impinging signal on the surface of the RIS 500. The origin of the x-axis 504, y-axis 506, and z-axis 508 is hidden from view.

The bottom layer 412 of the RIS 500 is the base substrate layer composed of a first dielectric material (such as BCB) that provides electrical properties such as a low dielectric constant, and strong dielectric stability versus temperature. BCB has a relative permittivity of 2.6, a dielectric loss tangent of 0.002 and a relative permeability of 1. The BCB material enables low production costs associated with the fabrication of the BCB polymer substrate. BCB is an organic material that has stable permittivity values and low losses over the broad THz range, which demonstrated electrical properties are important and advantageous in the RIS 500. In one non-limiting example implementation, for the operating frequency of f=140 GHz, the bottom layer 412 of an individual unit-cell 408 has a thickness of 200 μm, a length of 2877 μm, and a width of 3240 μm.

The middle layer 414 of the RIS 500 is a set of discretely distributed dielectric substrate material with tunable dielectric properties. In other words, the middle layer 414 of the RIS 500 is composed of the second dielectric material having tunable dielectric properties, as introduced above. As an example, second dielectric material has a dielectric constant that varies from 1.1 to 6. Other dielectric properties of the second dielectric material include: an ability to sustain low losses and a relatively low dielectric constant as well as thermal stability. The tunable dielectric substrate material enables control of the phase of each unit-cell 408 by tuning the dielectric constant of the middle layer 414.

In order to achieve the widest beam-scanning angle, the RIS 500 utilizes the largest phase shift that can be achieved when tuning the dielectric properties of the middle layer 414. According to test results, in one non-limiting example implementation, the maximum phase shift achieved at the operating frequency of f=140 GHz is fifty-three degrees (53°), resulting in a maximum calculated beam-steering angle of 10°. The distance of separation between the structure of the unit-cells 408 (center-to-center) is 959 μm, which meets a desirable subwavelength size condition. The spacing is acceptable due to the flexibility in the electrical size of the unit-cell 408 (~, λ/2). As a design parameter for the operating frequency of f=140 GHz, the middle layer 414 of each unit-cell 408 can dimensions of 800×700×50 μm$^3$.

The top layer 410 of the RIS 500 is composed of a conductive material, such as a thin layer of metal. The top layer 410 has a reflection coefficient value that corresponds to substantially total reflection at an operating frequency of the unit-cell, such that the reflected impinging wave represents a substantially total reflection of the impinging wave that propagates at the operating frequency. The conductive material of the top layer 410 has a reflection coefficient value of nearly 1, which represents total reflection. In the embodiments shown, the conductive material is gold, but it is understood that another conductive material having properties similar to gold could be used without departing form the scope of this disclosure. Properties of gold include a relative permittivity of 1, a dielectric loss tangent of 0, relative permeability of 0.99996, and a bulk conductivity of 4.11× 107 Siemens per meter (S/m). The conductive material of the top layer 410 has properties such as reliable and stable contacts with low resistivity. In some embodiments, the conductive material is copper, which has good conductivity properties. However, compared to gold, copper is more susceptible to corrosion, which can create current resistance.

The top layer 410 of the RIS 500 is a 2D array of sub-wavelength reflective patterns that reflect an impinging wave. That is, the top layer 410 is structured according to the sub-wavelength (metallic) reflective pattern that reflects an impinging wave at a predetermined phase. The sub-wavelength reflective pattern is an inverted L-shaped pattern for the operating frequency of substantially 140 GHz. In one non-limiting example implementation, for the operating frequency of f=140 GHz, the structure of the top layer 410 is such that each unit cell 408 has an inverted L-shaped metallic pattern in which the dimensions are: major length L of 700 μm, major width W of 160 μm, minor length $L_S$ of 45 μm, and minor width $W_S$ of 295 μm. The thickness of the gold top layer 414 is 20 μm. Note the design parameters, L, W, $L_S$, and $W_S$ are chosen to tune the width of the unit-cell 408 structure, which may contribute to achieving operation at the desired operating frequency of 140 GHz. Tuning or modifying these design parameters can achieve a different operating frequency for the RIS 500. The inverted L-shape structure is a design parameter that provides total reflection at 140 GHz. Analogously, an L-shaped slot configuration that operates at 140 GHz is the exact opposite to the reflective unit surface and is a complementary structure provides transmission rather than reflection. Different operating parameters may be used based on desired operation.

Figure 6:
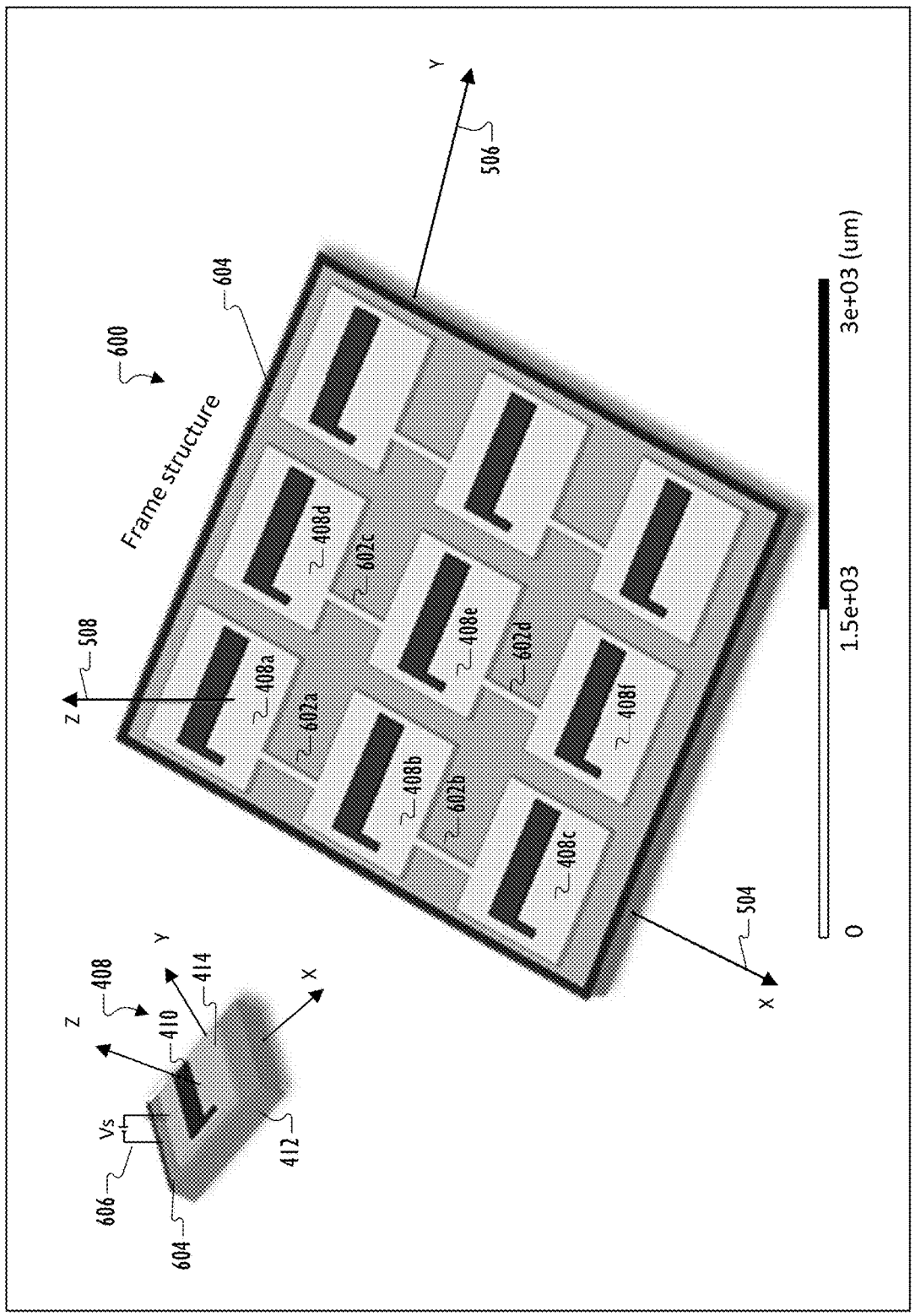
FIG. 6 illustrates an example FSS-based RIS in which a connecting trace connects adjacent unit-cells to each other according to this disclosure.
Figure 7A:
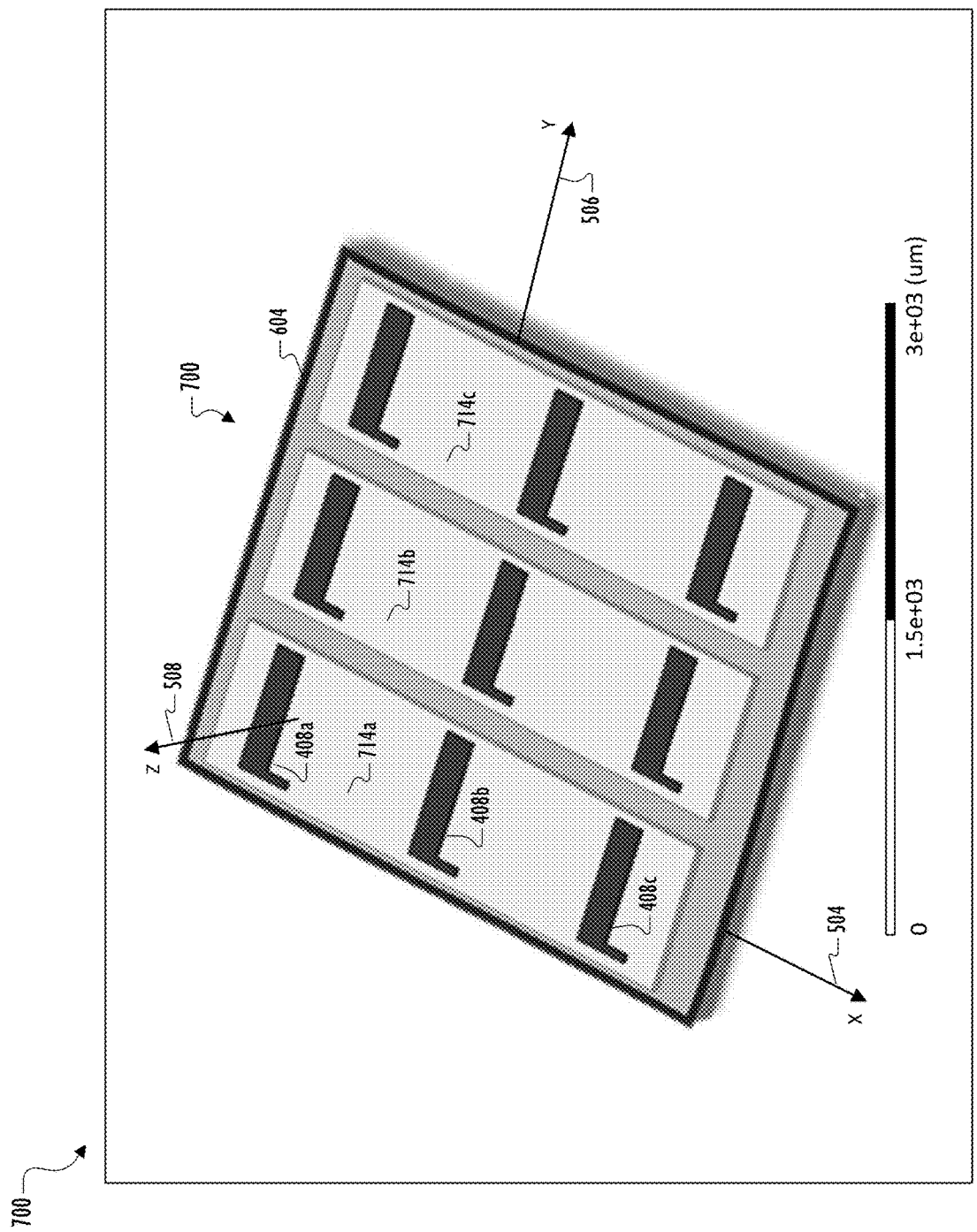
FIG. 7A illustrate an example FSS-based RIS in which a unified middle layer is shared among multiple unit-cells in a same column of an array according to this disclosure.

Although not shown, the RIS 500 is mounted on a frame ring structure, similar to the conducting frame 604 of FIGS. 6 and 7A. The frame ring structure acts as a ground plane and as a reference for the control voltages (e.g., $V_{s1-3}$ of FIG. 7B) used to tune the dielectric properties of each MS unit-cell 408.

Figure 7B:
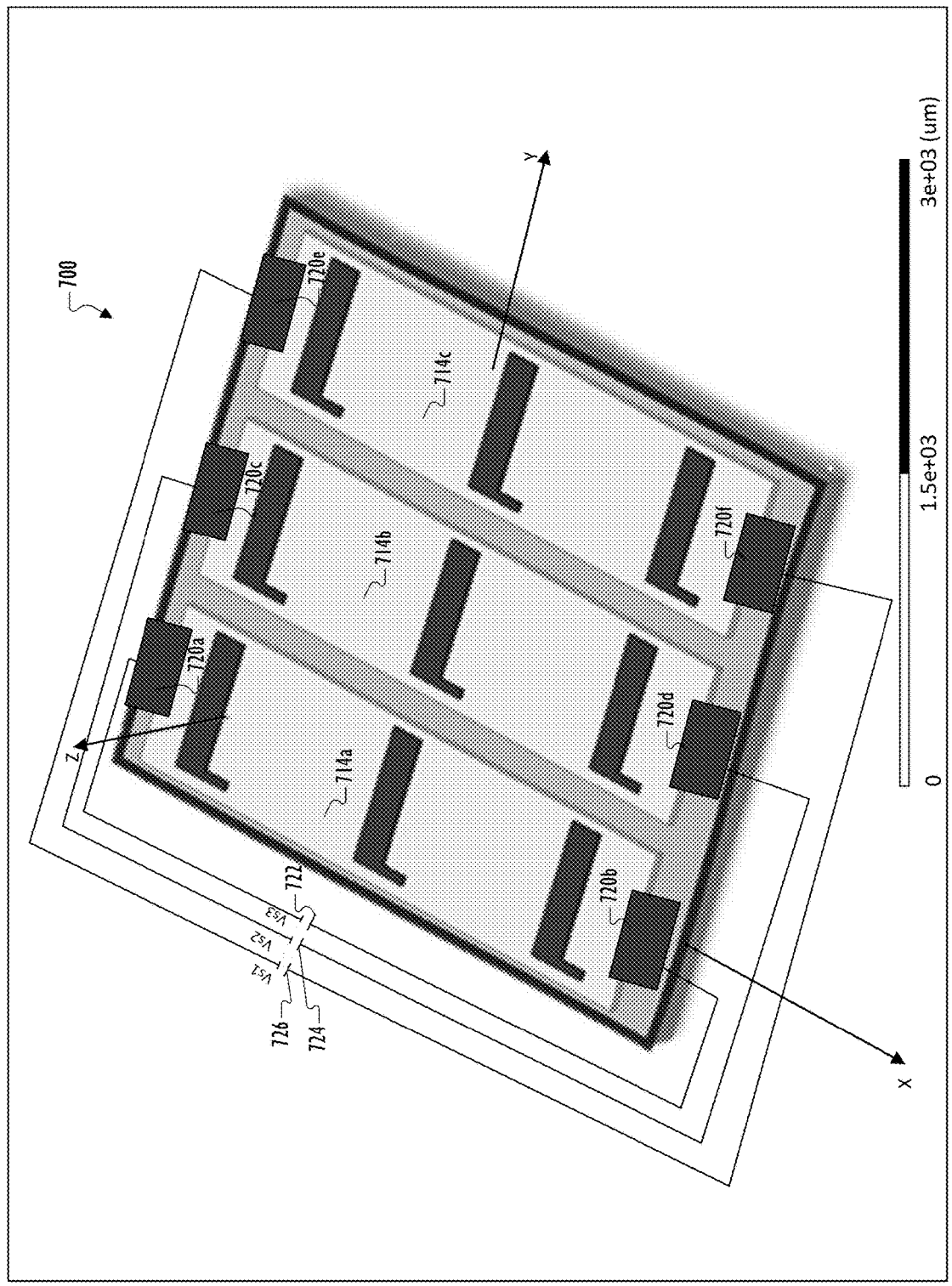
FIG. 7B illustrates the FSS-based RIS of FIG. 7A with electrodes according to this disclosure.
Figure 8:
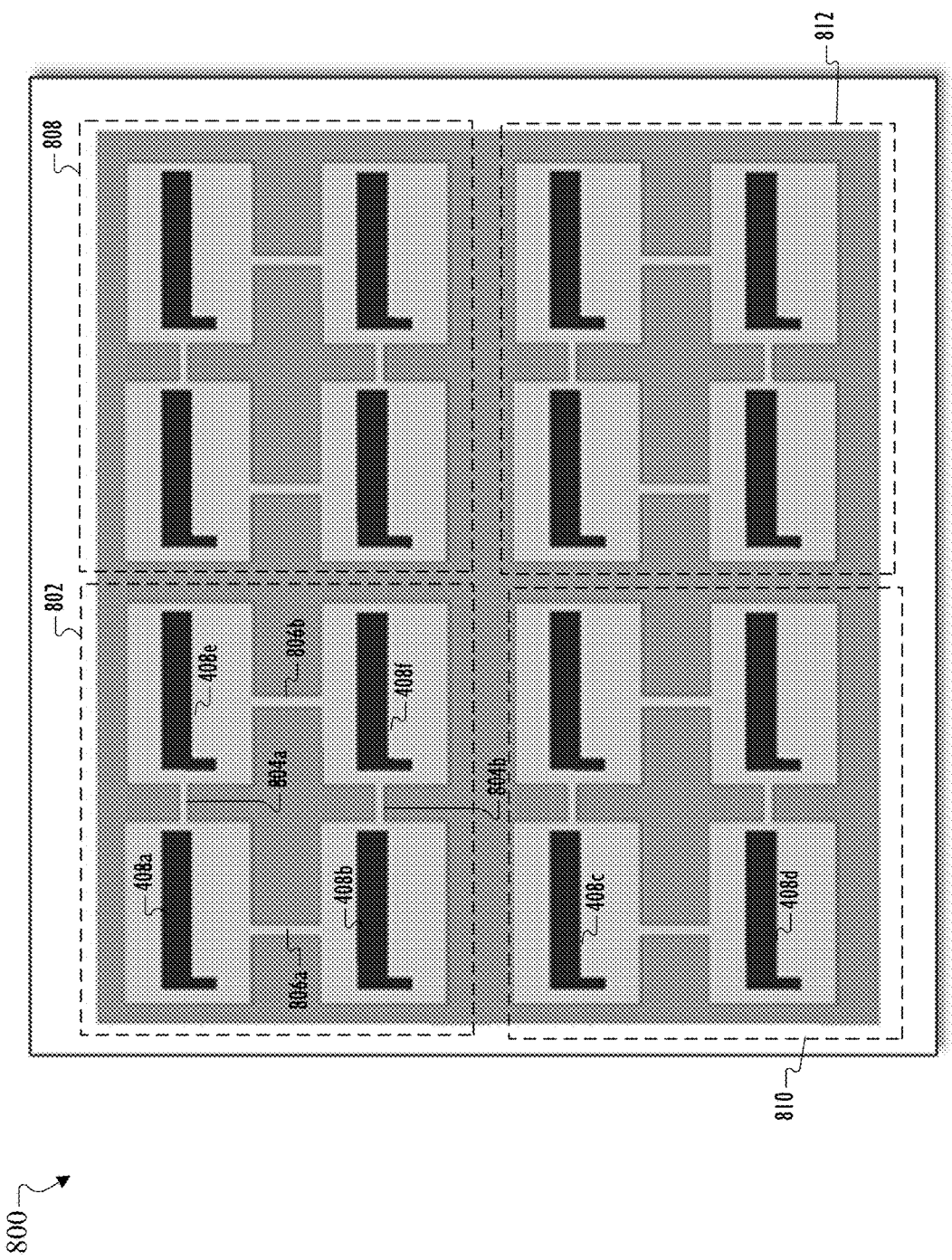
FIG. 8 illustrates an example FSS-based RIS in which unit-cells are divided into mutually exclusive tile groupings according to this disclosure.

As an introduction, FIGS. 6, 7, and 8 illustrate second, third, and fourth embodiments of the FSS-based RIS 600, 700, and 800 including a connection for manipulating the variation of the dielectric constant values of the tunable second dielectric material across individual columns of the RIS. In FIGS. 6 and 7, the connection provides independent connectivity of each column from the other columns by connecting the middle layer 414 of unit-cells 408 that are positioned in a single column. In FIG. 8 the connection connects the middle layer 414 of unit-cells 408 in a tile grouping, which enables each tile grouping to control the beam steering and provide an independent phase independent from each of the other tile groupings. Additional details regarding FIGS. 6, 7, and 8 are described below, sequentially.

FIG. 6 illustrates an example FSS-based RIS 600 in which a connecting trace 602 connects adjacent unit-cells 408 to each other according to this disclosure. The RIS 600 of FIG. 6 represents a second embodiment and can be the same as or similar to the RIS 406 of FIG. 4.

In the RIS 600, each of the columns of the 3×3 array includes a subset of the plurality of unit-cells 408 in which a pair of adjacent unit-cells are connected to each other by a connecting trace. Particularly, in the first column, a first connecting trace 602a connects the middle layer 414 of a first unit-cell 408a to the middle layer 414 of a second unit-cell, which is adjacent to the first unit-cell. The subset of unit-cells 408a-408c of the first of the column of the array of the RIS 600 can have a different voltage from the subset of unit-cells 408d-408f of a second of the columns of the array. In a second column, the connecting trace 602d connects the middle layer 414 of a second-row unit-cell 408e to the middle layer 414 of the adjacent, third-row unit-cell 408f.

Examples of the connecting trace 602 include a line trace, or a connecting trace wider than a line trace. The width and thickness of the connecting traces 602a-602d is a design parameter, which can be depend on whether the RIS 600 will be installed indoors or outdoors. A thinner connecting trace, such as the line trace, has a higher the chance that the line traces breakdown due to heat. Heat may be excessive in an outdoor environment or in a non-climate controlled indoor environment.

The RIS 600 includes an additional conducting frame 604 structure that is utilized in the process of changing the voltage of the middle layer 414 in each column, which results in a discrete phase shift. The conducting frame 604 can be a ring structure that encircles a perimeter of the bottom layer 412 of the RIS 600.

Additionally, FIG. 6 shows a zoomed-in view of an individual unit-cell 408 that forms the array of the RIS 600. One lead of the voltage source 606 (Vs) is connected to the middle layer 414, and the other lead of the voltage source 606 is connected to the conducting frame 604. The voltage source 606 can output different voltage levels at different times. That is, the voltage source 606 applies a variable voltage to the tunable dielectric substrate of the middle layer 414, which provides the specific phase needed for steering the reflected wave 409. In the RIS 600, one voltage source 606 is used per column instead of per element. Although only one voltage source 606 is shown in FIG. 6, multiple voltage sources 606 can connect to the multiple columns of the RIS 600, such that each column is connected to an independent one of the voltage sources 606. The voltage level output by a voltage source 606 changes the dielectric constant of the middle layer 414 of the column to which the voltage source is connected, and thereby changes the phase of the reflected wave 409 from the RIS 600. Each independent voltage source 606 introduces a linear and progressive phase variation to the reflected wave 409 from the surface of the RIS 600, by applying proper applied voltage distribution. A technique of controlling the slope of the voltage distribution applied to the columns of the RIS 600 is a technique that achieves a one-dimensional (1D) beam-scanning. This technique can be extended to achieve 2D beam-scanning when each unit-cell 408 in the RIS 600 has an independent voltage source 606, which can be controlled independent of the other elements in the RIS 600. The set of voltages that control the RIS 600 are configured to create variation of the dielectric constant of the material substrate in the middle layer 414 to steer the beam in any desirable direction in 2D space.

By way of comparison, the FSS-based RIS 600 of this disclosure competes with phased array antennas that are popular for beamforming and beam-steering. The phased array antennas have a complex system design as well as excessive RF chains. However, the FSS-based RIS 600 of this disclosure achieves beam-steering intelligently by connecting each unit-cell 408 in the same column together, as shown in FIGS. 6, rather than keeping each unit-cell 408 independent (i.e., not connected to another). In a similar way as the FSS-based RIS 600, the FSS-based RIS 700 of FIGS. 7A-7B competes with phased array antennas, as each unit-cell 408 in the same column are connected to each other in both RISs 600 and 700.

FIG. 7A illustrates an example FSS-based RIS 700 in which a unified middle layer is shared among multiple unit-cells in a same column of an array according to this disclosure. The RIS 700 of FIG. 7A represents a third embodiment and can be the same as or similar to the RIS 406 of FIG. 4. Some of the components of FIG. 6, such as the conducting frame 604, can be used in the RIS 700 of FIG. 7 in the same or similar way.

As described above, reducing the width of the connecting substrate (such as the thin connection traces 602) makes the FSS-based RIS more susceptible to thermal energy induction, which can result in a higher probability of breakdown of these thin lines. In comparison to FIG. 6, which shows that the connection (i.e., via connection traces 602) is thinner connection, FIG. 7 shows a complete connection in the individual columns to solve thermal loss problems that may occur in the thinner, connection traces 602. That is, the unified middle layers 714a-714c of the RIS 700 can be considered connection traces that are wider layer and/or thicker than those (602) of FIG. 6.

In the RIS 700, each of the columns of the 3×3 array includes a subset of the plurality of unit-cells 408 in which the middle layer of each unit-cell is one of the unified middle layers 714a-714c shared with each other unit-cell in the column. The unified middle layer 714a of the first of the columns of the array can have a different voltage from the unified middle layer 714b of second of the columns of the array, which in turn has can have a different voltage from the third unified middle layer 714c. More particularly, in this third embodiment of the RIS 700, the first unified middle layer 714a is formed by unification of the following five features: (i) middle layer 414 of the second unit-cell 408ba in the first column; (ii) its connection to the middle layer of the adjacent, first unit-cell 408a; (iii) its connection to the middle layer of the adjacent, third unit-cell 408c; (iv) the middle layers 414 of the first unit-cell 408a; and (v) the middle layer 414 of the third unit-cell 408c. The other unified middle layers 714b-714c are respectfully formed in an analogous way.

FIG. 7B illustrates the FSS-based RIS 700 of FIG. 7A in which electrodes 720a-720f are on (e.g., electrically connected to, sitting on) the middle layer of each column of the array. Particularly, a first voltage source 722 ($V_{s3}$) to applies a control voltage to the electrodes 720a-720b that are on the first unified middle layer 714a. Analogously, the second and third voltage sources 724 ($V_{s2}$) and 726 ($V_{s1}$) apply control voltages to the second and third unified middle layers 714b and 714c, respectively, via the electrodes 720c-720d and 720e-720f, respectively. As described above, the tuning of the dielectric constant of the second dielectric material is by a control voltage applied to the middle layer via the electrode. The control voltages $V_{s1-3}$ applied to each column is a design parameter, which may be the same for all columns or different for one or more of the columns. Selecting the control voltages is an important design parameter for controlling the angle of the reflected wave 409 and for affecting phase variance.

FIG. 8 illustrates an example FSS-based RIS 800 in which unit-cells 408 are divided into mutually exclusive tile groupings according to this disclosure. The RIS 800 of FIG. 8 represents a fourth embodiment and can be the same as or similar to the RIS 406 of FIG. 4. In the RIS 800 the plurality of unit-cells 408 are arranged in a 4×4 array, and also divided into mutually exclusive tile groupings, such as the first tile grouping 802.

Each tile grouping (e.g., 802) includes a subset of the plurality of unit-cells (e.g., 408a, 408b, 408e, 408f) in which each unit-cell (e.g., 408a) is connected to a horizontally-adjacent unit-cell (e.g., 408e) in a same row as the unit-cell (e.g., 408a) and to a vertically-adjacent unit-cell (e.g., 408b) in a same column as the unit-cell (e.g., 408a). That is, within each tile grouping 802 horizontal connection traces 804a-804b connect unit-cells 408a, 408b of a first column to horizontally-adjacent unit-cells 408e, 408f in a same row, respectively. Similarly, each tile grouping 802 includes vertical connection traces 806a-806b connect unit-cells 408a, 408e of a first row to vertically-adjacent unit-cells 408b, 408f in a same column, respectively. In the example, shown, the first tile grouping 802 includes a 2×2 sub-array, but other embodiments can include sub-arrays of different dimensions.

The MS 800 includes four tile groupings 802, 808, 810, and 812, each being similar to the first tile grouping 802. The middle layer 414 of each square tile grouping (802) is connected to one of four voltage sources (not shown, but similar to the voltage sources 722-726 of FIG. 7B). That is, the subset of unit-cells of each tile grouping (e.g., 802) of the array has a different voltage from another subset of unit-cells of another tile grouping (e.g., 810) of the array. This tile grouping will affect the beam steering capability of the RIS 800.

The reconfigurable intelligent surfaces 600, 700, 800, 900 of FIGS. 6-9 show four examples in which an $N_{RIS} \times M_{RIS}$ array divided into $N_{RIS} \times 1$ single-column sub-arrays or tile grouping sub-arrays. However, various design parameters can be changed such that the array of another FSS-based RIS includes unit-cells connected in $1 \times M_{RIS}$ single-row sub-arrays.

Figure 9:
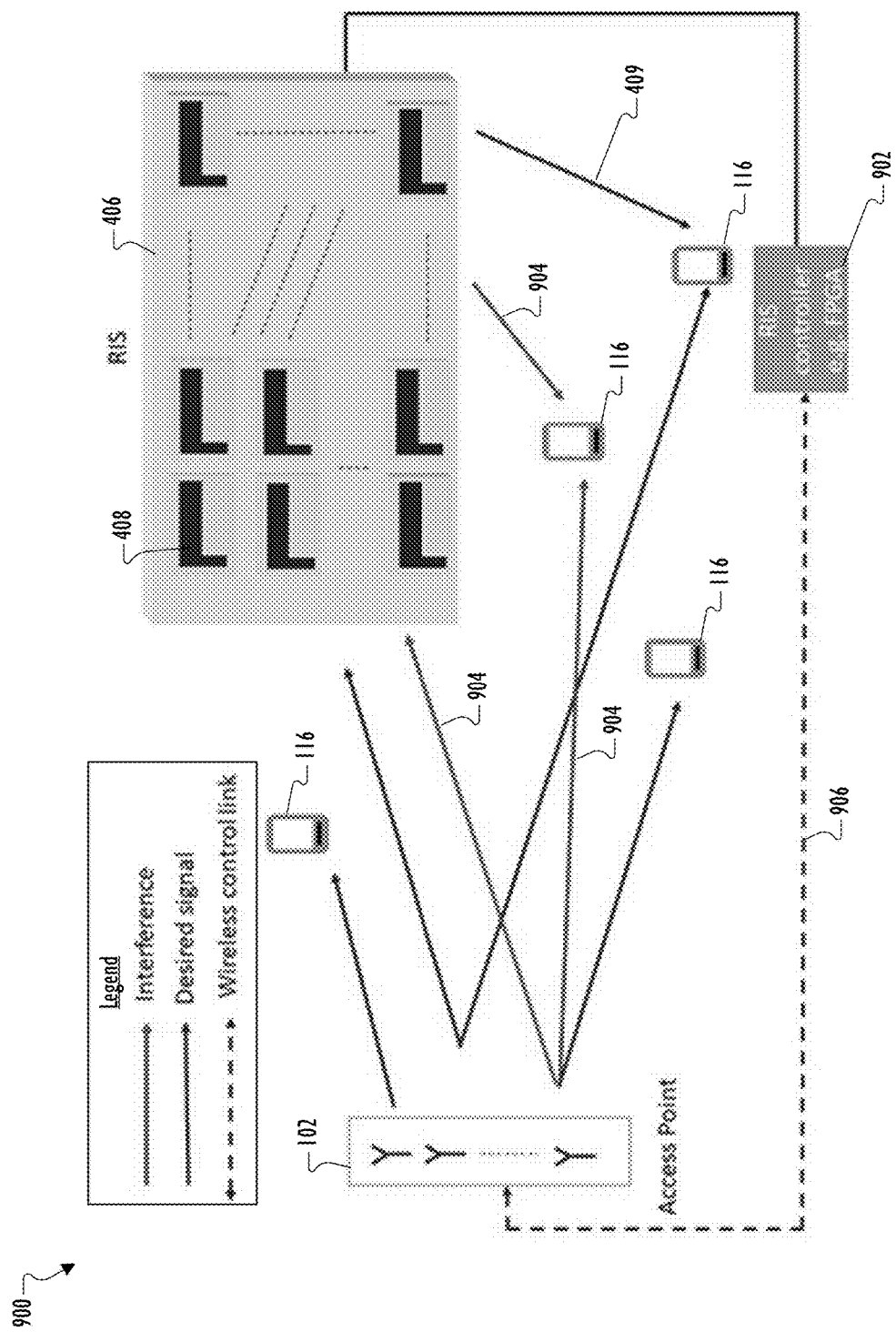
FIG. 9 illustrates an example wireless communication system in which an RIS controller is coupled to an FSS-based RIS and to an access point that transmits signals to multiple receivers according to this disclosure.

FIG. 9 illustrates an example wireless communication system in which an MS controller 902 is coupled to the FSS-based RIS 406 of FIG. 4 and to an access point that transmits signals to multiple receivers according to this disclosure. The access point is implemented as the eNB 102 of FIG. 2, and the multiple receivers are implemented as UEs 116 of FIG. 3. As described above, the FSS-based RIS 406 of FIGS. 4 and 9 is for illustration only and have the same or similar configuration as any of the fist through fourth embodiments of the FSS-based RIS 500, 600, 700, 800 of FIGS. 5-8.

One example transmission direction, from the eNB 102 to the UEs 116, is shown in FIG. 9. Some signals might cause interference 904 at some UEs 116 (i.e., receiving devices). The RIS controller 902 provides the technical advantage of controlling the phase appropriately to manage or avoid negative effects of inter-cell interference. In order to adjustably control the phase of a reflected wave 409, the RIS controller 902 selects a control voltage applicable to the middle layer 414 of one or more unit-cells 408 in order to tune the dielectric constant.

The RIS controller 902 is operably connected to the RIS 406. The MS controller 902 detects a wireless control link signal 906 output from a transmitter, such as the eNB 102. The RIS controller 902 identifies a control voltage to be applied to one or more of the unit-cells 408 of the RIS 406, based on the wireless control signal 906. The RIS controller 902 controls one or more voltage sources (e.g., 722-726 of FIG. 7B) that apply the identified control voltage to the second layer of 414 of the unit-cells 408 of the RIS 406. In certain embodiments, to select the proper voltage level to be applied to a subset of the unit-cells 408 of the RIS 800, the RIS controller 902 controls the voltage at each column or at each tile grouping in the RIS 406. Particularly, the voltage sources apply the control voltage to electrodes 720 (FIG. 7B) that are on the second layer of 414 of the unit-cells 408.

The RIS controller 902 can include one or more processors or other processing devices that control the overall operation of the FSS-based RIS 406. For example, the RIS controller 902 could support selecting (such as from a looking up table) a control voltage level that corresponds to tuning the second dielectric material of a particular subset of one or more unit-cells 408 such that the top layer 410 of the RIS 406 reflects an impinging wave at a predetermined phase and steers at a predetermined angle. In some embodiments, the RIS controller 902 includes an FPGA. In some embodiments, the RIS controller 902 includes at least one microprocessor or microcontroller.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A reconfigurable intelligent surface (RIS) comprising:
a unit-cell that includes:
a first layer composed of a conductive material and structured according to a sub-wavelength reflective pattern that reflects an impinging wave at a predetermined phase and that steers the reflected impinging wave toward an intended receiver;
a second layer composed of a first dielectric substrate material; and
a middle layer positioned between the first layer and the second layer and composed of a second material having tunable dielectric properties, wherein tuning a dielectric constant of the second material modifies the predetermined phase of reflection of the impinging wave,
wherein the unit-cell of the RIS is one of a plurality of unit-cells in which middle layers of a pair of adjacent unit-cells are connected to each other by a connecting trace at the middle layers, and
wherein the sub-wavelength reflective pattern is an inverted L-shaped pattern.

2. The RIS of claim 1, wherein the first layer has a reflection coefficient value that corresponds to substantially total reflection at an operating frequency of the unit-cell, such that the reflected impinging wave represents a substantially total reflection of the impinging wave that propagates at the operating frequency.

3. The RIS of claim 2, wherein:
the operating frequency is substantially 140 GHz; and
within the pair of adjacent unit-cells, the inverted L-shaped pattern is the structure of the first layer of a first unit-cell, and another inverted L-shaped pattern is the structure of the first layer of a second unit-cell adjacent to the first unit-cell.

4. The RIS of claim 1, further comprising:
electrodes on the middle layer,
wherein the tuning of the dielectric constant of the second material is by a control voltage applied to the middle layer via the electrodes.

5. A device comprising the RIS of claim 4 and a frequency selective surface (FSS) based RIS controller operably connected to the RIS, the FSS based RIS controller configured to:
detect a wireless control signal output from a transmitter;
identify, based on the wireless control signal, the control voltage to be applied to the unit-cell; and
control a voltage source that provides the control voltage to the electrodes.

6. The RIS of claim 1, wherein the unit-cell of the RIS is one of a plurality of unit-cells arranged in a two-dimensional (2D) array of $N_{RIS}$ rows and $M_{RIS}$ columns.

7. The RIS of claim 6, wherein:
each of the columns of the array includes a subset of the plurality of unit-cells in which a pair of adjacent unit-cells are connected to each other by a connecting trace that is a line trace.

8. The RIS of claim 6, wherein:
each of the columns of the array includes a subset of the plurality of unit-cells in which the middle layer of each unit-cell is a unified middle layer shared with each other unit-cell in the column; and
the subset of unit-cells of a first of the columns of the array has a different voltage from the subset of unit-cells of a second of the columns of the array.

9. The RIS of claim 6, wherein:
the plurality of unit-cells are divided into mutually exclusive tile groupings, each tile grouping including a subset of the plurality of unit-cells in which unit-cell is connected to a horizontally-adjacent unit-cell in a same row as the unit-cell and to a vertically-adjacent unit-cell in a same column as the unit-cell.

10. The RIS of claim 1, wherein within the pair of adjacent unit-cells, a distance of separation is between a structure of one unit-cell from a structure of another unit-cell.

11. A system comprising:
a unit-cell of a reconfigurable intelligent surface (RIS), the unit-cell comprising:
a first layer composed of a conductive material and structured according to a sub-wavelength reflective pattern that reflects an impinging wave at a predetermined phase and that steers the reflected impinging wave toward an intended receiver;
a second layer composed of a first dielectric material; and
a middle layer positioned between the first layer and the second layer and composed of a second material having tunable dielectric properties, wherein tuning a dielectric constant of the second material modifies the predetermined phase of reflection of the impinging wave; and
a frequency selective surface (FSS) based RIS controller operably connected to the RIS, the FSS based RIS controller configured to control operation of the RIS,
wherein the unit-cell of the RIS is one of a plurality of unit-cells in which middle layers of a pair of adjacent unit-cells are connected to each other by a connecting trace at the middle layers, and
wherein the sub-wavelength reflective pattern is an inverted L-shaped pattern.

12. The system of claim 11, wherein the first layer has a reflection coefficient value that corresponds to substantially total reflection at an operating frequency of the unit-cell, such that the reflected impinging wave represents a substantially total reflection of the impinging wave that propagates at the operating frequency.

13. The system of claim 12, wherein:
the operating frequency is substantially 140 GHz; and
within the pair of adjacent unit-cells, the inverted L-shaped pattern is the structure of the first layer of a first unit-cell, and another inverted L-shaped pattern is the structure of the first layer of a second unit-cell adjacent to the first unit-cell.

14. The system of claim 11, wherein the RIS further comprises:
electrodes on the middle layer,
wherein the tuning of the dielectric constant of the second material is by a control voltage applied to the middle layer via the electrodes.

15. The system of claim 14, wherein the FSS-based RIS controller is further configured to:
detect a wireless control signal output from a transmitter;
identify, based on the wireless control signal, the control voltage to be applied to the unit-cell; and
control a voltage source that provides the control voltage to the electrodes.

16. The system of claim 11, wherein the unit-cell of the RIS is one of a plurality of unit-cells arranged in a two-dimensional (2D) array of $N_{RIS}$ rows and $M_{RIS}$ columns.

17. The system of claim 16, wherein:
each of the columns of the array includes a subset of the plurality of unit-cells in which a pair of adjacent unit-cells are connected to each other by a connecting trace that is a line trace.

18. The system of claim 16, wherein:
each of the columns of the array includes a subset of the plurality of unit-cells in which the middle layer of each unit-cell is a unified middle layer shared with each other unit-cell in the column; and
the subset of unit-cells of a first of the columns of the array has a different voltage from the subset of unit-cells of a second of the columns of the array.

19. The system of claim 16, wherein:
the plurality of unit-cells are divided into mutually exclusive tile groupings, each tile grouping including a subset of the plurality of unit-cells in which unit-cell is connected to a horizontally-adjacent unit-cell in a same row as the unit-cell and to a vertically-adjacent unit-cell in a same column as the unit-cell.

20. The system of claim 11, wherein within the pair of adjacent unit-cells, a distance of separation is between the sub-wavelength reflective pattern of one unit-cell from the sub-wavelength reflective pattern of another unit-cell.

* * * * *